April 5, 1966 A. TURECKI 3,244,985

CIRCUITS INCLUDING A FLIP-FLOP AND A DELAY FOR GENERATING TWO PULSES

Filed Oct. 31, 1963

INVENTOR.

ANATOLE TURECKI

BY Samuel Cohen

Attorney

United States Patent Office
3,244,985
Patented Apr. 5, 1966

3,244,985
CIRCUITS INCLUDING A FLIP-FLOP AND A DELAY FOR GENERATING TWO PULSES

Anatole Turecki, North Palm Beach, Fla., assignor to Radio Corporation of America, a corporation of Delaware Filed Oct. 31, 1963, Ser. No. 320,412
7 Claims. (Cl. 328—74)

This invention relates to new and improved circuits for generating two consecutive timing pulses. Such circuits are commonly used in input-output control modules of data processing machines.

The circuits of the invention include a flip-flop, a feedback path from one of the output terminals of the flip-flop to one of the input terminals of the flip-flop, and a delay means in the feedback path. The feedback path may also include, in a specific form of the invention, a multiple input coincidence gate, such as a NOR gate. The output pulses are taken from the input and output terminals, respectively, of the delay means.

Figure 1A:
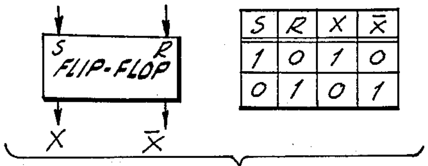
Figure 1B:
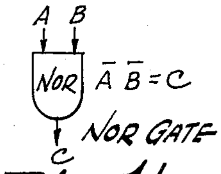
Figure 1C:
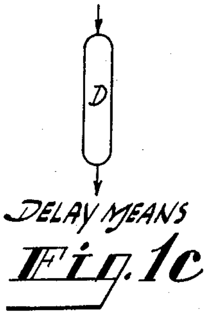
Figure 2:
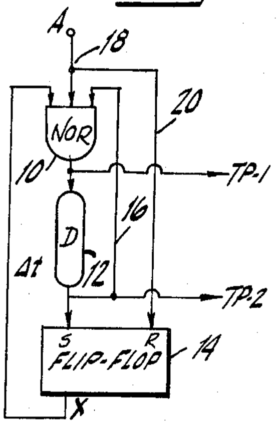
Figure 3:
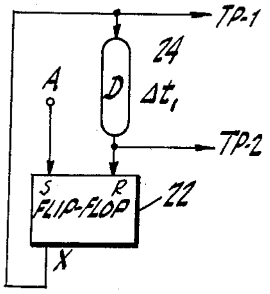
Figure 4:
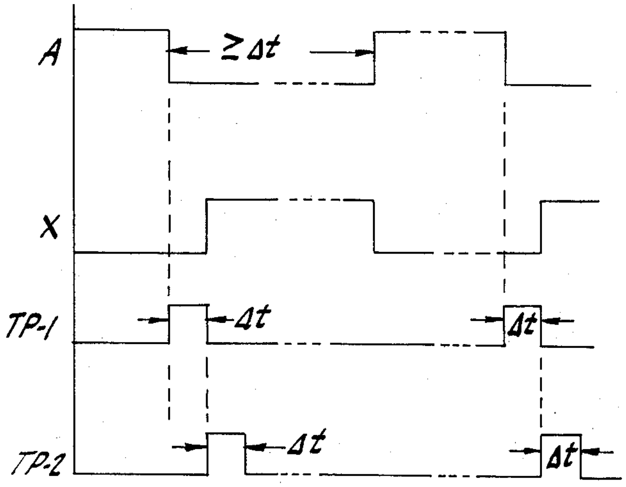
Figure 5:
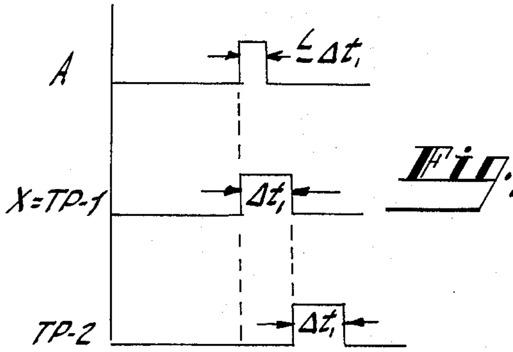

The invention is discussed in greater detail below and is shown in the following drawings of which:

FIGS. 1*a*–1*c* are drawings of symbols employed in FIGS. 2 and 3;

FIGS. 2 and 3 are block circuit diagrams of two different forms of the invention; and FIGS. 4 and 5 are drawings of waveforms which are referred to in the explanation of the operation of the circuits of FIGS. 2 and 3, respectively.

FIGS. 1*a*–1*c* are believed to be self-explanatory. The truth table to the right of the flip-flop in FIG. 1*a* gives the convention assumed for the flip-flop. The Boolean equation to the right of the NOR gate of FIG. 1*b* defines the logic operation performed by this gate. The delay means of FIG. 1*c* may comprise a delay line. Also, it may be desirable to include in the delay means driver and receiver transistors, at the input and output ends respectively of the delay line, for improving the wave shape and amplitude.

The circuit of FIG. 2 includes a NOR gate 10 which is connected through a delay means 12 to the set (S) terminal of flip-flop 14. The X output of the flip-flop is fed back as one of the inputs to NOR gate 10. The output terminal of delay means 12 is connected as a second input to NOR gate 10 via lead 16. The third input to the NOR gate is input signal A which is applied to terminal 18. The signal is also applied via lead 20 to the reset (R) terminal of flip-flop 14.

In the discussion which follows of the operation of the circuit of FIG. 2, both FIGS. 2 and 4 should be referred to. Also, in this explanation, the assumption is arbitrarily made that a relatively high level signal represents the binary digit one and a relatively low level signal represents the binary digit zero. For the sake of brevity, the outputs and inputs to various circuits are referred to as ones or zeros rather than as signals representing ones or zeros.

Initially, A, the input signal, is a one causing flip-flop 14 to be reset. In this condition $X=0$. $X=0$ is a priming signal for NOR gate 10. TP–2 is also initially zero and this also acts as a priming signal for NOR gate 10.

When A changes from one to zero, the three inputs to NOR gate 10 are all zero and the NOR gate therefore becomes enabled. Accordingly, TP–1 changes from zero to one. After the interval $\Delta t$ inserted by delay means 12, TP–2 changes from zero to one. This sets flip-flop 14 changing X to one. When X changes to one, NOR gate 10 becomes disabled so that TP–1 changes back to zero. The time required after the occurrence of the signal $A=0$, for X to change from zero to one, is substantially equal to the delay interval $\Delta t$ inserted by the delay means 12. Therefore, the duration of timing pulses TP–1 is also equal to $\Delta t$.

At the time TP–1 changes to zero, TP–2 is still a one. However, after the delay interval $\Delta t$, the zero arrives at the output of delay means 12 so that TP–2 changes to zero. Thus, the duration of pulse TP–2, as well as of pulse TP–1, is also $\Delta t$.

An important feature of the circuit of FIG. 2 is that it is insensitive to the duration of the $A=0$ pulse. If the $A=0$ pulse is equal to or longer than $\Delta t$, as illustrated in FIG. 4, then the two output pulses each have a duration $\Delta t$ and the leading edge of the second output pulse is coincident with the lagging edge of the first output pulse. If the duration of the $A=0$ pulse is less than $\Delta t$, the two output pulses each have the duration of the $A=0$ pulse, and the leading edge of the second output pulse is spaced from the lagging edge of the first output pulse. Another feature of the circuit of FIG. 2 is that it is self-resetting.

The circuit of FIG. 3 includes a flip-flop 22 and a delay means 24. The X output terminal of the flip-flop is connected through the delay means 24 to the reset terminal of the flip-flop 22.

In the discussion which follows of the operation of the circuit of FIG. 3, both FIGS. 3 and 5 should be referred to. It is assumed that the flip-flop is initially reset so that $X=0$. When the input signal A is changed to a one, this sets the flip-flop and TP–1 changes from zero to one. After the interval $\Delta t_1$ inserted by delay line 24, TP–2 changes to one and this resets flip-flop 22. When the flip-flop 22 is reset, X changes to zero so that TP–1 changes back to zero. After the interval $\Delta t_1$, timing pulse TP–2 changes back to zero. Both timing pulses TP–1 and TP–2 therefore have the same duration, namely a duration substantially equal to $\Delta t_1$.

The circuit of FIG. 3 is somewhat simpler than the one of FIG. 2 since the NOR gate is not required. However, in the circuit of FIG. 3 the input pulse A must be not greater than $\Delta t_1$, the delay inserted by the delay means. In certain data processing circuit applications where an input command pulse is relatively short, the circuit of FIG. 3 may be employed. In others, where relatively long direct current levels are employed to actuate the pulse generator, the circuit of FIG. 2 is used.

In the circuit of FIG. 2 a NOR gate is employed as the input coincidence gate. It should be appreciated that other types of coincidence gates may be employed instead. As one example, with minor circuit modification, an AND gate may be substituted for the NOR gate. In this event, the $\overline{X}$ rather than the X output terminal is connected back to the coincidence gate. Also, inverters are inserted in series with the leads 16 and 20. Also, the actuating signal is $A=1$ rathen than $A=0$.

In the circuit of FIG. 3 a set-reset flip-flop is employed. A triggerable flip-flop may be used instead. In this case the triggering pulse A may be applied to the trigger input terminal. In a particular triggerable flip-flop in practical use as a data processing machine module, an $A=1$ pulse applied to the trigger input terminal does not prevent a 1 on the set or reset terminal from setting or resetting the flip-flop, respectively. Therefore, when this triggerable flip-flop is used in the circuit of FIG. 3, the $A=1$ pulse can have any duration, including a duration substantially greater than $\Delta t_1$.

In both the circuits of FIGS. 2 and 3 the minimum duration of the A pulse is not given. In both cases the minimum duration of the A pulse is that duration required to change the state of a flip-flop.

In the circuit of FIG. 3, employing a triggerable flip-flop, it is possible to generate relatively long output pulses even if multiple input pulses are present during the period of TP–2. For example, assume that each such input pulse has a duration of $\Delta t_2$ and that there are five such input pulses spaced intervals $\Delta t_2$ during TP–2. Assume also that the delay line duration is $\Delta t_3$ which is say twelve times the duration of $\Delta t_2$. In a circuit of this type, the output pulses TP–1 and TP–2 produced will each have the duration $\Delta t_3$ and will be unaffected by the fact that multiple input pulses are occurring during the time TP–2 is produced.

It is possible to operate the circuit of FIG. 3 in still another way if the flip-flop is of the type which is capable of assuming three states. Two of the states are shown in FIG. 1*a*. The third state is that in which a one present at both set and reset input terminals produces a zero at both the X and $\overline{X}$ output terminals. If a flip-flop of this type is employed, the A pulse applied to the set terminal of FIG. 3 may have a duration of less than or more than $2\Delta t_1$ and, in either case, two output pulses TP–1 and TP–2, each of duration $\Delta t_1$ are produced.

What is claimed is:

1. A two pulse generator circuit comprising, in combination:
- a flip-flop having two input terminals;
- means coupled to one input terminal of the flip-flop for switching the flip-flop from a first to a second storage state;
- a circuit, including delay means, directly connected between an output terminal and a second input terminal of the flip-flop for switching the flip-flop back to its first storage state, after the delay interval inserted by the delay means, in response to the output signal produced by the flip-flop, when it is switched from its first to its second storage state;
- an output terminal at the input terminal of the delay means at which one output pulse is produced; and
- an output terminal at the output terminal to the delay means at which a second output pulse is produced.

2. In combination:
- a coincidence gate having three input terminals;
- a flip-flop having two input terminals;
- a delay means connected at its input terminal to the output terminal of the gate and connected at its output terminal to the first of the input terminals to the flip-flop and to one of the input terminals to the gate, for placing the flip-flop in a first state and disabling the gate in response to a signal indicative of a binary digit of one value and for tending to enable the gate in response to a signal indicative of a binary digit of the other value;
- means coupled to a second input terminal of the gate and to the second input terminal of the flip-flop for disabling the gate and placing the flip-flop in its second state in response to a signal indicative of a binary digit of one value, and for tending to enable the gate in response to a signal indicative of a binary digit of the other value; and
- a feedback connection from an output terminal of the flip-flop to the third input terminal of the gate for applying a signal to the gate which tends to enable the gate when said flip-flop is in said second state, and which disables the gate when said flip-flop is in its first state.

3. In combination:
- a coincidence gate having three input terminals;
- a flip-flop having two input terminals;
- a delay means connected at its input terminal to the output terminal of the gate and connected at its output terminal to the first of the input terminals to the flip-flop and to one of the input terminals to the gate, for placing the flip-flop in a first state and disabling the gate in response to a signal indicative of a binary digit of one value and for tending to enable the gate in response to a signal indicative of a binary digit of the other value;
- means coupled to a second input terminal of the gate and to the second input terminal of the flip-flop for disabling the gate and placing the flip-flop in its second state in response to a signal indicative of a binary digit of one value, and for tending to enable the gate in response to a signal indicative of a binary digit of the other value;
- a feedback connection from an output terminal of the flip-flop to the third input terminal of the gate for applying a signal to the gate which tends to enable the gate when said flip-flop is in said second state, and which disables the gate when said flip-flop is in its first state;
- an output terminal at the input terminal of the delay means at which one output pulse is produced; and
- an output terminal at the output terminal to the delay means at which a second output pulse is produced.

4. In combination:
- a NOR gate having three input terminals;
- a flip-flop having two input terminals;
- a delay means connected at its input terminal to the output terminal of the gate and connected at its output terminal to the first of the input terminals to the flip-flop and to one of the input terminals to the gate, for placing the flip-flop in a first state in response to a signal indicative of the binary digit one and for tending to enable the gate in response to a signal indicative of the binary digit zero;
- means coupled to a second input terminal of the gate and to the second input terminal of the flip-flop for disabling the gate and placing the flip-flop in its second state in response to a signal indicative of the binary digit one, and for tending to enable the gate in response to a signal indicative of the binary digit zero; and
- a feedback connection from an output terminal of the flip-flop to the third input terminal of the gate for applying a signal to the gate which tends to enable the gate when said flip-flop is in said second state, and which disables the gate when said flip-flop is in its first state.

5. A circuit for generating two pulses of the same duration comprising, in combination:
- a delay means having an input terminal and an output terminal;
- means for applying an input direct current level to the input terminal of the delay means of a duration longer than the delay introduced by the delay means;
- a feedback path from the output terminal of the delay means to the input terminal thereof for unconditionally inhibiting the input to the delay means in response to the delayed direct current level which appears at the output terminal of the delay means;
- and two output terminals, one at the input terminal of the delay means and one at the output terminal of the delay means at which two output pulses of the same duration are produced.

6. A two pulse generator circuit comprising, in combination:
- a flip-flop having first and second input terminals and an output terminal;
- means for applying a signal to the first input terminal for changing the state of the flip-flop;

a feedback path between said output terminal and the second input terminal of said flip-flop for applying a signal to said second terminal for restoring the flip-flop responsive to said change of state of said flip-flop to its original storage state, said feedback path including a delay means;

an output terminal at the input terminal of said delay means at which one output pulse is produced; and an output terminal at the output terminal of the delay means at which a second output pulse is produced.

7. A two pulse generator circuit as set forth in claim 6 wherein said feedback path consists solely of said delay means.

References Cited by the Examiner

UNITED STATES PATENTS

| | | | |
|---|---|---|---|
| 2,892,998 | 6/1959 | Eckert et al. | 328—55 |
| 3,145,342 | 8/1964 | Hill | 307—88.5 |

ARTHUR GAUSS, *Primary Examiner.*